(12) United States Patent
Shaked et al.

(10) Patent No.: US 10,713,585 B2
(45) Date of Patent: Jul. 14, 2020

(54) USING TEMPLATE EXPLORATION FOR LARGE-SCALE MACHINE LEARNING

(71) Applicant: Google LLC, Mountain View, CA (US)

(72) Inventors: Tal Shaked, Los Altos, CA (US); Tushar Deepak Chandra, Los Altos, CA (US); James Vincent McFadden, San Francisco, CA (US); Yoram Singer, Palo Alto, CA (US); Tze Way Eugene Ie, San Francisco, CA (US)

(73) Assignee: Google LLC, Mountain View, CA (US)

( * ) Notice: Subject to any disclaimer, the term of this patent is extended or adjusted under 35 U.S.C. 154(b) by 888 days.

(21) Appl. No.: 14/106,900

(22) Filed: Dec. 16, 2013

(65) Prior Publication Data

US 2020/0151614 A1    May 14, 2020

(51) Int. Cl.
*G06N 20/00* (2019.01)

(52) U.S. Cl.
CPC ................... *G06N 20/00* (2019.01)

(58) Field of Classification Search
None
See application file for complete search history.

(56) References Cited

U.S. PATENT DOCUMENTS

| | | | | |
|---|---|---|---|---|
| 5,649,073 A | * | 7/1997 | Knox | .................. H04N 1/4078 358/1.9 |
| 5,801,970 A | * | 9/1998 | Rowland | .............. G01S 3/7865 342/63 |
| 6,714,941 B1 | * | 3/2004 | Lerman | ............. G06F 17/30864 |
| 7,613,662 B2 | * | 11/2009 | Tsirigos | ................. G06F 19/22 702/19 |
| 7,644,052 B1 | * | 1/2010 | Chang | .................... G06N 5/022 706/45 |

(Continued)

OTHER PUBLICATIONS

Dave et al., "Mining the Peanut Gallery: Opinion Extraction and Semantic Classification of Product Reviews," WWW '03 Proceedings of the 12th international conference on World Wide Web, May 20-24, 2003, pp. 519-528.

(Continued)

*Primary Examiner* — Ann J Lo
*Assistant Examiner* — Viker A Lamardo
(74) *Attorney, Agent, or Firm* — Fish & Richardson P.C.

(57) ABSTRACT

Systems and techniques are provided for template exploration in a large-scale machine learning system. A method may include obtaining multiple base templates, each base template comprising multiple features. A template performance score may be obtained for each base template and a first base template may be selected from among the multiple base templates based on the template performance score of the first base template. Multiple cross-templates may be constructed by generating a cross-template of the selected first base template and each of the multiple base templates. Performance of a machine learning model may be tested based on each cross-template to generate a cross-template performance score for each of the cross-templates. A first cross-template may be selected from among the multiple cross-templates based on the cross-template performance score of the cross-template. Accordingly, the first cross-template may be added to the machine learning model.

20 Claims, 3 Drawing Sheets

(56) References Cited

U.S. PATENT DOCUMENTS

| | | | | |
|---|---|---|---|---|
| 8,108,361 | B2* | 1/2012 | Netz | G06F 17/30501 380/28 |
| 8,190,537 | B1* | 5/2012 | Singh | G06N 99/005 706/12 |
| 8,249,361 | B1* | 8/2012 | Steffens | G06K 9/6203 382/118 |
| 8,756,172 | B1* | 6/2014 | Radovanovic | G06N 99/005 706/12 |
| 8,849,790 | B2* | 9/2014 | Bellare | G06F 17/30265 706/45 |
| 2005/0256652 | A1* | 11/2005 | Li | C12Q 1/6837 702/20 |
| 2010/0067754 | A1* | 3/2010 | Collins | G06K 9/6292 382/128 |
| 2012/0033863 | A1* | 2/2012 | Wojton | A61B 5/0013 382/128 |
| 2015/0161521 | A1* | 6/2015 | Shah | G06F 17/278 706/12 |

OTHER PUBLICATIONS

Fawcett and Provost, "Adaptive Fraud Detection," Data Mining and Knowledge Discovery, 1(3):291-316, 1997.

Hinton, "Training Products of Experts by Minimizing Contractive Divergence," Technical Report, University College London, Aug. 2002, 19 pages.

Koza, "Genetic Programming: A Paradigm for Genetically Breeding Populations of Computer Programs to Solve Problems," Technical Report, Stanford University, Jun. 1990, 131 pages.

Tieu and Viola, "Boosting Image Retrieval," Proceedings of the IEEE Conference on Computer Vision and Pattern Recognition 2000, Jun. 13-15, 2000, pp. 228-235.

* cited by examiner

USING TEMPLATE EXPLORATION FOR LARGE-SCALE MACHINE LEARNING

BACKGROUND

Large-scale data processing may include extracting data of interest from raw data in one or more databases and processing it into a data product. For example, regression analysis may be conducted based on a very large dataset and includes statistical processes for estimating the relationships among variables. It may be used to predict or forecast a given action or event and may be based on analyzing historical or test data containing variables that contribute to the prediction and forecasting. As a specific example, large-scale machine learning systems may process large amounts of training data from data streams received by the system. A data stream may include training examples corresponding to specific instances of an event or action such as when a user selects a specific search result, or when a single video is viewed from among multiple videos presented to a user. An example may contain features (i.e., observed properties such as a user being located in the USA, a user preferring to speak English, etc.) and may also contain a label which may indicate an event or action associated with the example (e.g., a user selected a specific search result, a user did not select a specific search result, a user viewed a particular video, etc.). These examples may be used to generate statistics for each of the features and these statistics may be used to generate a model. As a result, a machine learning system may use this model to make predictions.

BRIEF SUMMARY

According to an embodiment of the disclosed subject matter, a method may include obtaining a plurality of base templates, each base template comprising a plurality of features. A template performance score may be obtained for each base template. A first base template may be selected from the plurality of base templates based on the template performance score of the first base template. A first plurality of cross-templates may be constructed by generating a cross-template of the selected first base template and at least one of the plurality of base templates. The performance of a machine learning model may be tested based on each of the first plurality of cross-templates to generate a cross-template performance score for each of the first plurality of cross-templates. Next, a first cross-template of the first plurality of cross-templates may be selected based on the cross-template performance score of the first cross-template and the first cross-template may be added to the machine learning model.

An implementation of the disclosed subject matter provides a system including a processor configured to obtain a plurality of base templates, each base template comprising a plurality of features. A template performance score may be obtained for each base template. A first base template from the plurality of base templates may be selected based on the template performance score of the first base template. A first plurality of cross-templates may be constructed by generating a cross-template of the selected first base template and at least one of the plurality of base templates. The performance of a machine learning model may be tested based on each of the first plurality of cross-templates to generate a cross-template performance score for each of the first plurality of cross-templates. Next, a first cross-template of the first plurality of cross-templates may be selected based on the cross-template performance score of the first cross-template and the first cross-template may be added to the machine learning model.

Implementations of the disclosed subject matter provide template exploration techniques for use in large-scale machine learning. Because large-scale machine learning systems process large amounts of training data, e.g., features, techniques for improving model generation based on these features may be very helpful. By crossing templates of features for use in machine learning model generation, the overall performance of such systems may be improved. Additional features, advantages, and embodiments of the disclosed subject matter may be set forth or apparent from consideration of the following detailed description, drawings, and claims. Moreover, it is to be understood that both the foregoing summary and the following detailed description are examples and are intended to provide further explanation without limiting the scope of the claims.

BRIEF DESCRIPTION OF THE DRAWINGS

The accompanying drawings, which are included to provide a further understanding of the disclosed subject matter, are incorporated in and constitute a part of this specification. The drawings also illustrate embodiments of the disclosed subject matter and together with the detailed description serve to explain the principles of embodiments of the disclosed subject matter. No attempt is made to show structural details in more detail than may be necessary for a fundamental understanding of the disclosed subject matter and various ways in which it may be practiced.

DETAILED DESCRIPTION

In general, large-scale data processing systems process large amounts of data from various sources and/or machines. As a specific example, large-scale machine learning systems may process large amounts of training data from data streams received by the system. A data stream may include training examples corresponding to specific instances of an event or action such as when a user selects a specific search result, or when a single video is viewed from among multiple videos presented to a user. An example may contain features (i.e., observed properties such as a user being located in the USA, a user preferring to speak English, etc.) and may also contain a label which may indicate (e.g., positive or negative) the occurrence of an event or action associated with the example (e.g., a user selected a specific search result, a user did not select a specific search result, a user viewed a particular video, etc.).

A machine learning system may contain one or more learners. A learner may include numerous workers such as a mapper or a reducer. A single mapper may receive examples from multiple shards. As an example, a first mapper may receive example A and example B from a data stream. Both examples may contain features F1, F2, and F3. The mapper may generate a first statistic (e.g., based on a label indicating that a user selected a search result) for F1 based on example A and a second statistic (e.g., based on a label indicating that a user selected a search result) for F1 based on example B. More specifically, the mapper may indicate a +1 for F1 based on example A and a +1 for F1 based on example B. The two statistics for F1 (i.e., +1 and +1) may be combined at the mapper, resulting in an overall mapper statistic 'MS1' for F1 of +2. Similarly, a different mapper may also receive examples from other data streams, and generate an overall mapper statistic 'MS2' for F1 of +4 based on the respective examples in those data streams.

The overall mapper statistics (e.g., MS1 and MS2) for F1 may be provided to a reducer R1. The reducer R1 may be configured to collect overall mapper statistics from two or more mappers within the learner and generate a weight based on the collected mapper statistics. The reducer R1 may collect MS1 (i.e., +2) and may also collect MS2 (i.e., +4) and generate the weight +6. Similarly, a second reducer R2 may receive overall mapper statistics for feature F2 and generate a weight of −3. The reducers may provide the weights to a model such that the model contains at least the following:

Model: +6(F1)−3(F2) . . .

As described above, a machine learning system may receive and process 100s of billions of training examples, each example including multiple features. These 100s of billions of features may be used to generate a model, as shown above, and a machine learning model may be used to make predictions based on statistics associated with features in the model. Many machine learning algorithms use a variety of feature exploration techniques to produce more expressive models that can better capture patterns in the training data. However, when there are billions of features and billions of examples, standard feature exploration techniques do not scale well. Standard feature exploration techniques, such as those used by boosting algorithms, often add a small number of new features at a time to a model. This technique, however, does not scale well to machine learning models that may contain billions of features. As such, it may be advantageous to select some groups of features, from among the billions of features present in training data, to be included in the machine learning model.

The present disclosure provides techniques based on feature templates and template exploration. A template may be a category of feature-types and a template may include multiple features, all of which are from the same category. A template may be a single category of features (e.g., a base template) or multiple categories of features (e.g., a cross-template). A specific type of template may be a base template that is a single category of features. For example, a base template may be "language" and the features included in the template may be English, Spanish, French, German, Hindi, Italian, Japanese, and the like. Each of these features may be associated with a previous example that was received by the system. As another example, a base template may be "country" and the features included in the template may include United States, Canada, France, United Kingdom, Mexico, Japan, India, Italy, China, Australia, and the like. Yet another example may be the base template "keyword" that may include features such as "keyword:free" and "keyword:books". According to the present disclosure, a cross-template may also be constructed. A cross-template may be another special type of template that is a cross of two or more base templates. A cross-template may be constructed from a combination of templates such as "country X keyword" which will include features such as "US X books" and "France X free". In machine learning models that may contain 100s of billions of features, a well-performing model may have, for example, 100 or more total templates, many of which may be cross-templates containing 3 or more combinations of templates. Since exploring the space of all feature templates is infeasible, it is necessary to efficiently explore the space of templates based on estimating the gain of a cross-template containing a combination of multiple templates. This technique may be used to optimize performance of a machine learning model by using a greedy strategy for selecting templates and cross-templates to include in the model.

In general, a greedy strategy for generating a cross-template to include in a machine learning model may have multiple components. First, there may be a candidate set of templates based on which a cross-template may be created. There may be a selection technique used to identify the best candidate template which may be selected and added to the cross-template. The machine learning model may be tested using the candidate cross-template to determine if the candidate cross-template contributes to the performance of the machine learning model. For example, a cross-template performance score may be generated based on the performance of the machine learning model including the candidate cross-template. Based on the cross-template performance score, the candidate cross-template may be added to the machine learning model and may result in improved predictions by the machine learning system.

As a specific example, a machine learning system may be exploring 3 base templates {A, B, C} to be included in an empty machine learning model. Beginning with the empty model, first, the base templates {A, B, C} may each be scored. Base template B may be the highest scoring template and, as a result, may be added to the model. In the next round of template exploration, all base templates not added to the model plus all possible extensions (e.g., by one more base template) to the templates in the model may be explored. In this case the templates that may be scored may include {A, C, A X B, B X C}. Out of these templates, template B X C may be the highest and may be added to the model. As a result, the next round of template exploration may score the templates {A, C, A X B, A X B X C}. As such, each iteration for selecting a template may include scoring one or more base templates, and one or more cross-templates (i.e., which include two or more base templates).

Figure 1:
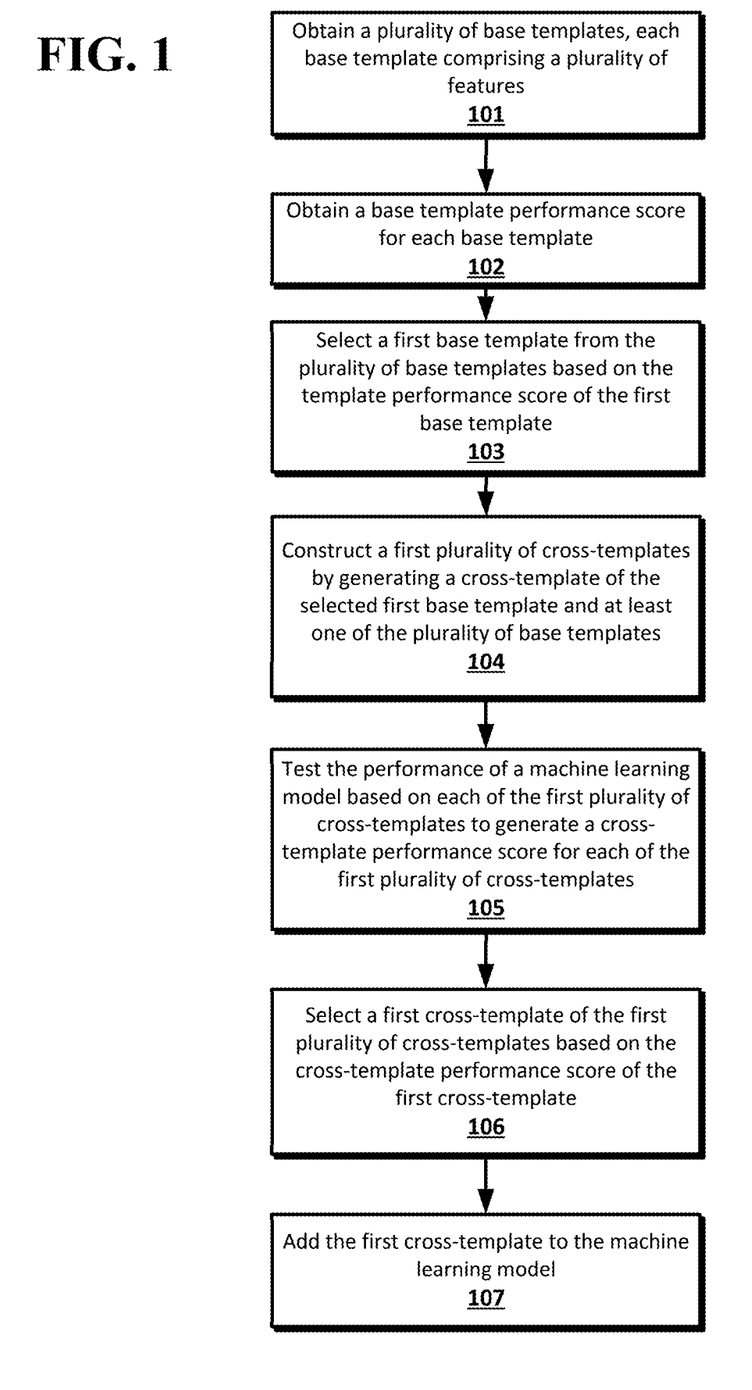
FIG. 1 shows an example process according to an implementation of the disclosed subject matter.

Implementations disclosed herein provide methods and systems for using template exploration for large-scale machine learning. FIG. 1 shows an example process according to an implementation of the disclosed subject matter. A system may include a processor configured to obtain multiple base templates and each base template may include multiple features, at 101. A template performance score may be obtained for each base template, at 102. A base template from among the multiple base templates may be selected based on the template performance score of the base template, at 103. Next, multiple cross-templates may be constructed by generating a cross-template of the selected base template and at least one of the multiple base templates, at 104. The performance of a machine learning model may be tested based on each of the multiple cross-templates to generate a cross-template performance score for each of the multiple cross-templates, at 105. A cross-template of the multiple cross-templates may be selected based on the cross-template performance score of the cross-template, at 106, and the cross-template may be added to the machine learning model, at 107.

A cross-template may be constructed from a combination of templates by generating a cross product by crossing all of the features from one template with all of the features from another template. For example, a template "country" may be crossed with a template "keyword". The template "country" may include the features "United States", "Canada", and "France" and the template "keyword" may include the features "books", "free", and "dog." A cross product template "country X keyword" would include the features "United States X books", "Canada X books", "France X books", "United States X free", "Canada States X free", "France X free", "United States X dog", "Canada X dog", and "France X dog". Each of these features in the cross template may be associated with examples in which the feature occurred. For example, a statistic associated with the feature "United States X books" would be based on examples in which both features "United States" and "books" were present. A cross template may be constructed from any number of templates; however, as the number of templates included in a cross template increase, the number of relevant examples may decrease. For example, in contrast to the cross template "country X keyword" described above, there may be a relatively small number of examples associated with a cross template "country X keyword X language X gender X result ID X video ID" since there may be only a few number of examples in which features from all the templates "country", "keyword", "language", "gender", "result ID", and "video ID" occurred. In some cases, a cross-template may be constructed based on self-crossing of a template. For example, the template "keyword" may include the features "plasma" and "TV". The system may have received 6 examples including the feature "plasma", 18 examples including the feature "TV" and among all these examples, 2 examples may include both the features "plasma" and "TV". The template "keyword" may be crossed with the template "keyword" in which case the relevant examples would be restricted to examples in which 2 or more features from the keyword template are included such as the 2 examples that included both features "plasma" and "TV".

Various template performance criteria may be used to generate a template performance score. Template performance criteria and techniques for generating a template performance score described herein may be used for any type of template, such as a base template, a cross-template, and the like. Template performance criteria may include, for example, a number of occurrences associated with features in a specific template, a number of impressions associated with features in a specific template, and the like. A number of occurrences may be the number of received training examples in which a specific feature was included. The number of occurrence for each feature in a template may be added up to generate a number of occurrences associated with the template. For example, a "country" template may include the features "United States", "Canada", "United Kingdom", and "France." The system may have received 26 examples including the feature "United States", 23 examples including the feature "Canada", 18 examples including the feature "United Kingdom", and 11 examples including the feature "France." Thus, the number of occurrences of features in the "Country" template may be 78. A higher number of occurrences of features in a specific template may allow a machine learning system to make more accurate predictions. As such, a template may be assigned a higher scored based on the template having a higher number of occurrences relative to one or more other templates having a lower number of occurrences. Additionally, a rate of occurrence may be generated for a template based on the number of occurrences of features in the template out of a set number of training examples (e.g., over a set time period, over all time, etc.) received by the system. This occurrence rate may also be used as a template performance criterion. As described above, computing a number of occurrences and/or an occurrence rate may also be performed for a cross-template based on all the features combined in a cross-template.

Another template performance criterion may be a number of impressions associated with features in a specific template. As mentioned above, a training example used for training a machine learning system typically contains a label corresponding to a resulting event or action (e.g., a user selected a search result, a user did not select the search result, a user viewed a video, etc.). An impression may refer to a positive event or action as indicated by a label included in an example having one or more features. Referring to the example above, among the 11 examples including the feature "France", 10 of these training examples may have a label indicating that a user selected a particular search result. Accordingly, the template "country" may be given +10 added to the number of impressions based on the 10 positively labeled examples that included the feature "France". In this case, 11 occurrences of the feature "France" may be a low frequency in relation to the number of occurrences of the other features "United States", "Canada", and "United Kingdom"; however, regarding the feature "France", 10 impressions (e.g., selections of a particular item by a user) out of 11 occurrences may be a significant signal in a machine learning model for making predictions associated with the features in the "country" template. Similar values may be added to the number of impressions associated with the "country" template based on the number of positively labeled examples including the features "United States", "Canada", and "United Kingdom." As such, the total number of impressions associated with the features in the "country" template may be used to assign a template performance score to the "country" template. Accordingly, the number of impressions associated with a template or a cross-template may be the total number of positive events or actions associated with the features in the template, received in training examples. In addition, a rate of impressions may be a template performance criterion. A rate of impressions may be generated for a template based on the number of impressions associated with each of the features in a template out of the total number of occurrences associated with each of the features in the template. As described above, computing a number of impressions and/or an impression rate may also be performed for a cross-template based on all the features combined in a cross-template.

The performance of a machine learning model in making predictions may be used to score the performance of a cross template included in the machine learning model. A machine learning model may be used by the machine learning system to make predictions based on the statistics generated for the features. The statistics generated for the features may help the machine learning system learn the weights for the features which may be part of the model and used to make predictions. For example, a model may be generated to predict the likelihood of a user selecting a specific search result for an automotive website. The model may contain weights $w1$, $w2$, and $w3$ for features associated with observed properties including a location being the United States, a preferred language being English, and a keyword 'automobiles' in a previous search query, respectively. The generated model may be applied to a search provider such that when a user conducts a search, the weights are applied to the features corresponding to the user conducting the search. More specifically, if it is detected that the user is located in the United States, prefers English, and has previously searched for "automobiles" then the weights w1, w2, and w3 associated with each of the features, respectively, may be used to predict the likelihood of the user selecting the search result for the automotive website. Based on the predicted likelihood, the automotive website search result may be presented to the user. Alternatively, if it is detected that the user is not located in the United States, but prefers English and has previously searched for "automobiles", then weights w2 and w3 may be used to predict the likelihood of the user selecting the search result for the automotive website.

In an implementation, a template performance score for a base template or a cross-template may be based on a degree of improvement of performance per feature of the machine learning model including a specific template relative to performance of the machine learning model excluding the specific template. For example, testing the performance of a machine learning model may be performed by assessing the accuracy of predictions made by the system based on the model including a specific template as compared to excluding the specific template. As a specific example, one or more statistics may be generated based on the cross template "country X keyword", for example a statistic may be generated for the feature "United States X dogs" based on examples in which both features "United States" and "dogs" were present. As a result, the system may generate more accurate predictions related to detected features "United States X dogs" based on the statistic for "United States X dogs" as compared to the predictions made based on separate statistics for "United States" and "dogs." In general, every feature in a template may have a performance score. One technique may be to sum the scores for every feature and use the sum as the overall performance score. Another technique may be to divide the sum of the scores for every feature in a template by the number of features in the template, to obtain a score per feature for the template as a whole.

Similarly, a performance score may also be based on a measure of a degree of improvement of performance of the machine learning model including a specific template relative to performance of the machine learning model excluding the specific template. In general, there may be an objective used to evaluate the predictions made by a machine learning model. Typically, an objective related to the learning algorithm may be used. In some cases, the accuracy of prediction made by a machine learning system may be assessed by comparing how often the system predicts a positive event when the event is in fact positive. For example, based on prediction made by the system, an automotive website search result may be presented to users 100 times. Out of these 100 presentations of the automotive website search result, 58 users may have selected (i.e., clicked on) the automotive website search result, indicating a positive outcome as a result of presenting the automotive website search result to users. This may indicate that predictions made by the machine learning model are accurate 58% of the time when presenting the automotive website search result. A cross-template such as "country X keyword" which may include the feature "United States X automobiles" may be included in the model. As a result, there may be an increase to 72% accuracy when presenting the automotive website search result to users. The cross-template performance score for the cross-template "country X keyword" may be based on this degree of improvement of performance of the machine learning model including the cross-template "country X keyword". Any other technique for testing performance of a machine learning model based on a template may be used. Similarly, other performance criteria may be used to generate a template performance score for a template.

Figure 2:
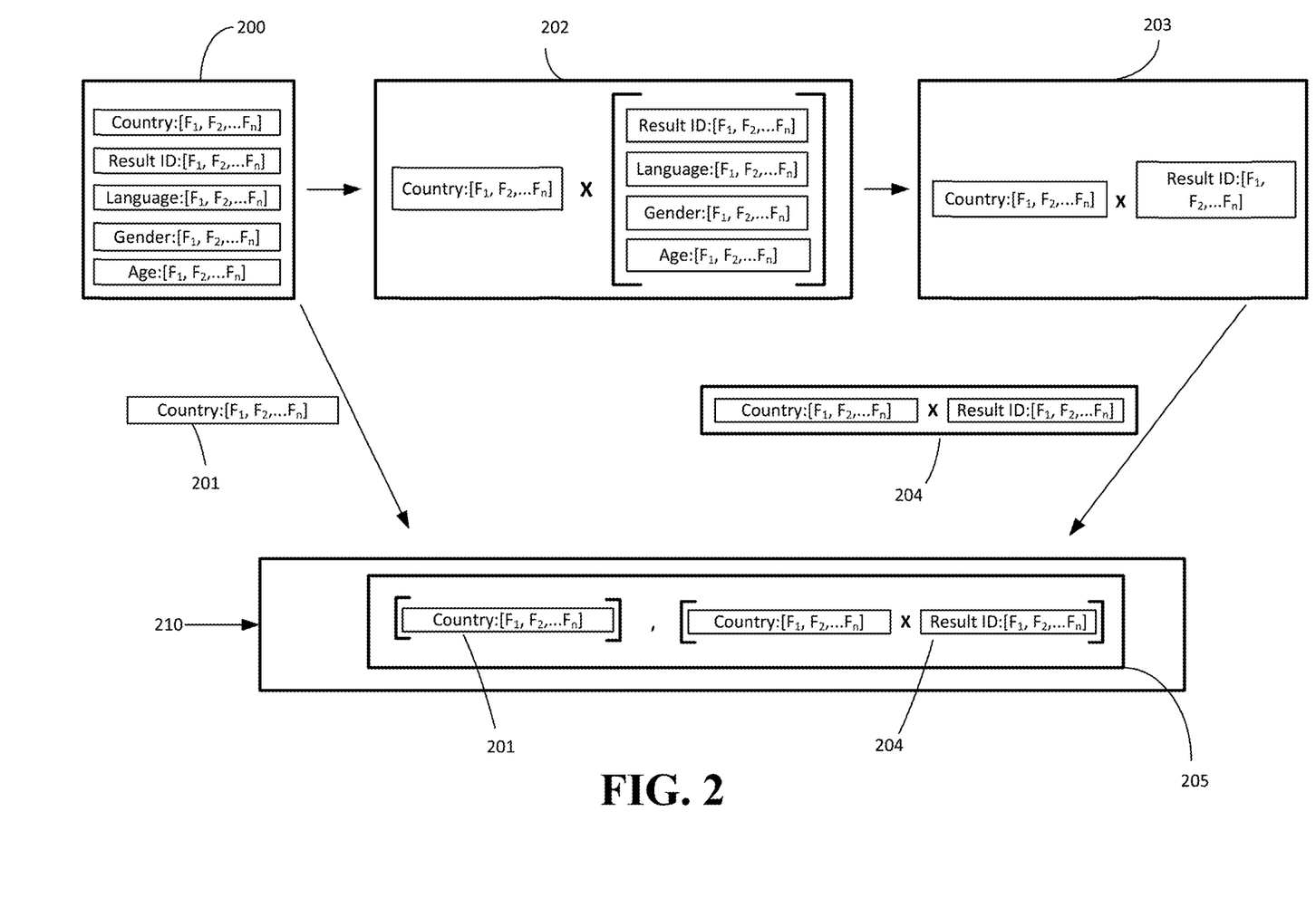
FIG. 2 shows an example template exploration technique according to an implementation of the disclosed subject matter.

FIG. 2 shows an example template exploration technique according to an implementation of the disclosed subject matter. In an implementation, a method may include obtaining multiple base templates 200 such as "country", "result ID", "language", "gender" and "age". Each of the templates "country", "result ID", "language", "gender" and "age" may include multiple features $F_1, F_2, \ldots F_n$. A template performance score may be obtained for each base template according to any template performance criteria, such as those described above. For example, the base template "country" may have a score of 88, the base template "result ID" may have a score of 76, the base template "language" may have a score of 73, the base template "age" may have a score of 62, and the base template "gender" may have a score of 56. Based on these template performance scores, the base template "country" may be selected based on it having the highest score of 88 as compared to the other base templates. As shown, the base template "country" 201 may be added to the machine learning model 210. Next, it may be advantageous to identify another template to cross with the template "country" 201 that may result in the model performing better than if the model only included the base template "country" 201. As such, at 202, multiple cross-templates may be constructed by generating a cross-template of the base template "country" and each of the base templates "result ID", "language", "age" and "gender". In particular, a cross-template "country X result ID" may be generated, a cross-template "country X language" may be generated, a cross-template "country X age" may be generated, and a cross-template "country X gender" may be generated.

Next, the performance of a machine learning model may be tested based on each of the cross-templates to generate a cross-template performance score for each of cross-templates "country X result ID", "country X language", "country X age", and "country X gender". A cross-template performance score may be generated for each of the cross-templates according to any cross-template scoring technique(s) such as those described above. As an example, the degree of improvement of performance of the machine learning model including each of the cross-templates may be measured and used to generate a score for each of the cross-templates. An assessment may be made as to which cross-template "country X result ID", "country X language", "country X age", and "country X gender" results in a greater improvement in performance by the model as compared to performance of the model only including the base template "country" 201. As a result, the cross template "country X result ID" may receive a performance score of 82, the template "country X language" may receive a performance score of 72, the template "country X age" may receive a performance score of 63, and the template "country X gender" may receive a performance score of 43. These cross-template performance scores may indicate that the accuracy of predictions made by the system improved more by including the cross-template "country X result ID" (i.e., cross-template performance score of 82) as compared to the cross-template "country X gender" (i.e., cross-template performance score of 43). As a result, at 203, the cross-template "country X result ID" may be selected based on it having the highest cross-template performance score of 82 as compared to the other cross-templates.

As shown in FIG. 2, based on the selection of the cross-template "country X result ID" 204, this cross-template may also be added to the machine learning model 210 such that the machine learning model 210 would include a cross-template 205 that includes the template "country" 201 and the cross-template "country X result ID" 204, i.e., "[country], [country X result ID]". The model 210 then may be used by a trained machine learning system to make a prediction and it may be found that the performance of the machine learning model 210 improves based on the cross template 205 "[country], [country X result ID]" as compared to the performance of the model including only one of the base templates "country" or "result ID".

According to an implementation, the steps described herein may be repeated resulting in additional base templates and/or cross-templates being added to the model 210. For example, multiple cross-templates may be constructed by generating a cross-template of the cross-template "country X result ID" and each one of the templates "language", "gender" and "age." Again, the performance of the machine learning model may be tested based on each of the cross-templates to generate a cross-template performance score for each of the cross-templates "country X result ID X language", country X result ID X gender", and country X result ID X age". Based on the cross-template performance scores, for example, the cross-template "country X result ID X language" may be selected based on it having the highest cross-template performance score. As a result, the cross template "country X result ID X language" may be added to the machine learning model 210. Accordingly, the machine learning model 210 then includes the templates "country" 201, the cross-template "country X result ID" 204, and the cross template "country X result ID X language", i.e., "[country], [country X result ID], [country X result ID X language]".

Implementations of the disclosed subject matter may be used in machine learning models that may contain millions of billions of features in templates. A model based on a single template often is not informative enough to provide accurate predictions; instead, an aggregate of features is more helpful for predictions, as such, it is advantageous to construct cross templates that include multiple templates. Since exploring the space of all of the 100s of billions of feature templates is infeasible in such large-scale machine learning systems, it may be desirable to efficiently explore the space of templates based on estimating the performance gain of a model including a cross-template that contains a combination of multiple templates. With each iteration of the techniques described herein, a selection of a template is based on an assessment of the performance gain of the model with each new template addition. This technique may be used to optimize performance of a machine learning model by using a greedy strategy for selecting base templates and cross-templates to include in the model. As a result, a machine learning system may be able to grow a frontier of templates that improve the overall prediction accuracy of the machine learning system.

Figure 3:
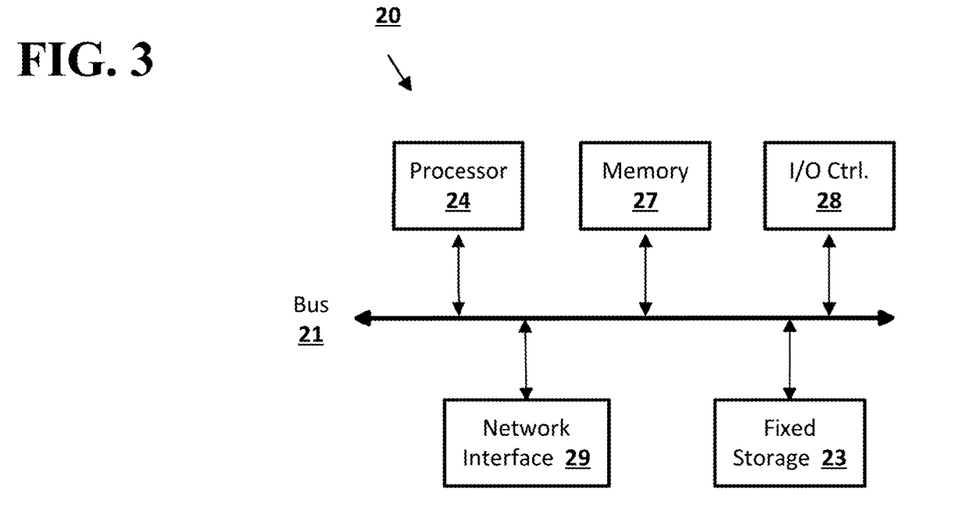
FIG. 3 shows a computer according to an embodiment of the disclosed subject matter.

Embodiments of the presently disclosed subject matter may be implemented in and used with a variety of component and network architectures. FIG. 3 is an example computer system 20 suitable for implementing embodiments of the presently disclosed subject matter. The computer 20 includes a bus 21 which interconnects major components of the computer 20, such as one or more processors 24, memory 27 such as RAM, ROM, flash RAM, or the like, an input/output controller 28, and fixed storage 23 such as a hard drive, flash storage, SAN device, or the like. It will be understood that other components may or may not be included, such as a user display such as a display screen via a display adapter, user input interfaces such as controllers and associated user input devices such as a keyboard, mouse, touchscreen, or the like, and other components known in the art to use in or in conjunction with general-purpose computing systems.

The bus 21 allows data communication between the central processor 24 and the memory 27. The RAM is generally the main memory into which the operating system and application programs are loaded. The ROM or flash memory can contain, among other code, the Basic Input-Output system (BIOS) which controls basic hardware operation such as the interaction with peripheral components. Applications resident with the computer 20 are generally stored on and accessed via a computer readable medium, such as the fixed storage 23 and/or the memory 27, an optical drive, external storage mechanism, or the like.

Each component shown may be integral with the computer 20 or may be separate and accessed through other interfaces. Other interfaces, such as a network interface 29, may provide a connection to remote systems and devices via a telephone link, wired or wireless local- or wide-area network connection, proprietary network connections, or the like. For example, the network interface 29 may allow the computer to communicate with other computers via one or more local, wide-area, or other networks, as shown in FIG. 4.

Many other devices or components (not shown) may be connected in a similar manner, such as document scanners, digital cameras, auxiliary, supplemental, or backup systems, or the like. Conversely, all of the components shown in FIG. 3 need not be present to practice the present disclosure. The components can be interconnected in different ways from that shown. The operation of a computer such as that shown in FIG. 3 is readily known in the art and is not discussed in detail in this application. Code to implement the present disclosure can be stored in computer-readable storage media such as one or more of the memory 27, fixed storage 23, remote storage locations, or any other storage mechanism known in the art.

Figure 4:
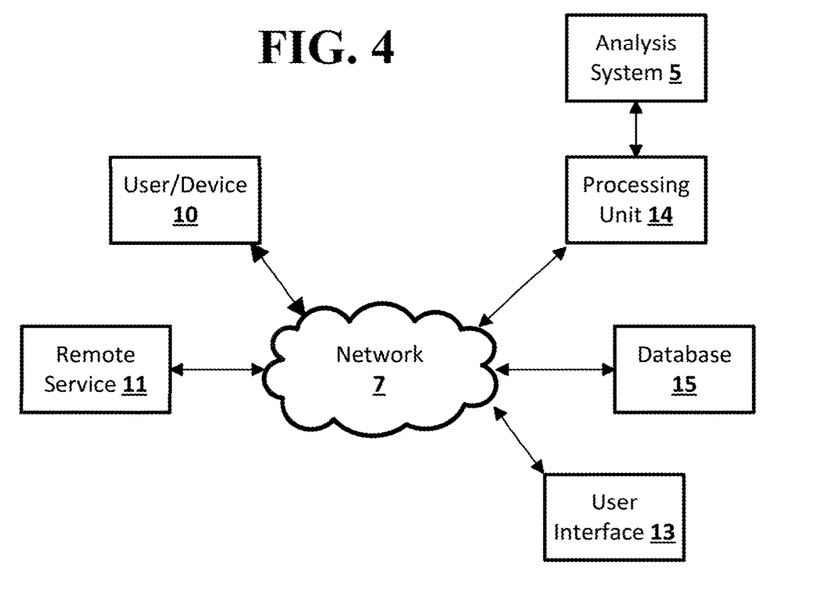
FIG. 4 shows a network configuration according to an embodiment of the disclosed subject matter.

FIG. 4 shows an example arrangement according to an embodiment of the disclosed subject matter. One or more clients 10, 11, such as local computers, smart phones, tablet computing devices, remote services, and the like may connect to other devices via one or more networks 7. The network may be a local network, wide-area network, the Internet, or any other suitable communication network or networks, and may be implemented on any suitable platform including wired and/or wireless networks. The clients 10, 11 may communicate with one or more computer systems, such as processing units 14, databases 15, and user interface systems 13. In some cases, clients 10, 11 may communicate with a user interface system 13, which may provide access to one or more other systems such as a database 15, a processing unit 14, or the like. For example, the user interface 13 may be a user-accessible web page that provides data from one or more other computer systems. The user interface 13 may provide different interfaces to different clients, such as where a human-readable web page is provided to web browser clients 10, and a computer-readable API or other interface is provided to remote service clients 11. The user interface 13, database 15, and processing units 14 may be part of an integral system, or may include multiple computer systems communicating via a private network, the Internet, or any other suitable network. Processing units 14 may be, for example, part of a distributed system such as a cloud-based computing system, search engine, content delivery system, or the like, which may also include or communicate with a database 15 and/or user interface 13. In some arrangements, an analysis system 5 may provide back-end processing, such as where stored or acquired data is pre-processed by the analysis system 5 before delivery to the processing unit 14, database 15, and/or user interface 13. For example, a machine learning system 5 may provide various prediction models, data analysis, or the like to one or more other systems 13, 14, 15.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as CD-ROMs, DVDs, hard drives, USB (universal serial bus) drives, flash drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation. When the computer program code is loaded into and executed by a computer, the computer becomes an apparatus for practicing embodiments of the disclosed subject matter. When implemented on a general-purpose microprocessor, the computer program code segments configure the microprocessor to create specific logic circuits. In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information, as previously described. The memory or other storage medium may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A computer-implemented method comprising:
   obtaining a computer-implemented machine learning model having features;
   obtaining three or more base templates, each base template comprising a plurality of features, wherein the features of each of the base templates are not found in any of the other base templates and the features of each of the base templates are not features of the machine learning model at a time of obtaining the three or more base templates;
   obtaining a respective template performance score for each base template;
   selecting a first base template from the three or more base templates based on the first base template having the highest template performance score relative to the performance scores of the other base templates;
   constructing a first plurality of cross-templates by generating a respective cross-template of the selected first base template and each of the other base templates;
   testing the performance of a computer-implemented machine learning model based on each of the first plurality of cross-templates to generate a respective cross-template performance score for each of the first plurality of cross-templates;
   selecting a first cross-template of the first plurality of cross-templates based on the cross-template performance score of the first cross-template; and
   adding the features of the first cross-template to the machine learning model.

2. The method of claim 1, further comprising adding the features of the first base template to the machine learning model.

3. The method of claim 1, wherein the cross-template performance score of the first cross-template measures a degree of improvement of performance per feature of the machine learning model including the first cross-template relative to a performance of the machine learning model excluding the first cross-template.

4. The method of claim 1, wherein the cross-template performance score of the first cross-template measures a degree of improvement of performance of the machine learning model including the first cross-template relative to performance of the machine learning model excluding the first cross-template.

5. The method of claim 1, wherein the template performance score of each base template is based on a degree of performance of a machine learning model including each base template.

6. The method of claim 1, wherein the performance score of each base template is based on a number of occurrences associated with each feature in a base template.

7. The method of claim 1, wherein the performance score of each base template is based on a number of impressions associated with each feature in a base template.

8. The method of claim 1, further comprising:
   constructing a second plurality of cross-templates by generating a cross-template of the first cross-template and each one of the other cross-templates in the first plurality of cross-templates; and
   testing the performance of a machine learning model based on each of the second plurality of cross-templates to generate a cross-template performance score for each of the second plurality of cross-templates; and
   selecting a second cross-template of the second plurality of cross-templates based on the cross-template performance score of the second cross-template.

9. The method of claim 8, further comprising:
   adding the features of the second cross-template to the machine learning model.

10. The method of claim 1, further comprising:
   training the machine learning model; and
   using the trained machine learning model to make a prediction.

11. A computer-implemented machine learning system configured, by instructions adapted to be executed by the machine learning system to:
   obtain a computer-implemented machine learning model having features;
   obtain three or more base templates, each base template comprising a plurality of features, wherein the features of each of the base templates are not found in any of the other base templates and the features of each of the base templates are not features of the machine learning model at a time of obtaining the three or more base templates;
   obtain a respective template performance score for each base template;
   select a first base template from the three or more base templates based on the first base template having the highest performance score relative to the performance scores of the other base templates;
   construct a first plurality of cross-templates by generating a respective cross-template of the selected first base template and each of the other base templates;
   test the performance of a machine learning model based on each of the first plurality of cross-templates to generate a respective cross-template performance score for each of the first plurality of cross-templates;
   select a first cross-template of the first plurality of cross-templates based on the cross-template performance score of the first cross-template; and
   add the features of the first cross-template to the machine learning model.

12. The system of claim 11, wherein the machine learning system is further configured to add the features of the first base template to the machine learning model.

13. The system of claim 11, wherein the cross-template performance score of the first cross-template measures a degree of improvement of performance per feature of the machine learning model including the first cross-template relative to a performance of the machine learning model excluding the first cross-template.

14. The system of claim 11, wherein the cross-template performance score of the first cross-template measures a degree of improvement of performance of the machine learning model including the first cross-template relative to performance of the machine learning model excluding the first cross-template.

15. The system of claim 11, wherein the template performance score of each base template is based on a degree of performance of a machine learning model including each template.

16. The system of claim 11, wherein the performance score of each base template is based on a number of occurrences associated with each feature in a template.

17. The system of claim 11, wherein the performance score of each base template is based on a number of impressions associated with each feature in a template.

18. The system of claim 11, wherein the machine learning system is further configured to:
   construct a second plurality of cross-templates by generating a cross-template of the first cross-template and each one of the other cross-templates in the first plurality of cross-templates; and
   test the performance of a machine learning model based on each of the second plurality of cross-templates to generate a cross-template performance score for each of the second plurality of cross-templates; and
   select a second cross-template of the second plurality of cross-templates based on the cross-template performance score of the second cross-template.

19. The system of claim 18, wherein the machine learning system is further configured to:
   add the features of the second cross-template to the machine learning model.

20. The system of claim 11, wherein the machine learning system is further configures to:
   train the machine learning model; and
   use the trained machine learning model to make a prediction.

* * * * *

UNITED STATES PATENT AND TRADEMARK OFFICE
CERTIFICATE OF CORRECTION

| | | |
|---|---|---|
| PATENT NO. | : 10,713,585 B2 | Page 1 of 1 |
| APPLICATION NO. | : 14/106900 | |
| DATED | : July 14, 2020 | |
| INVENTOR(S) | : Shaked et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 959 days.

Signed and Sealed this
Twentieth Day of December, 2022

*Katherine Kelly Vidal*

Katherine Kelly Vidal
*Director of the United States Patent and Trademark Office*